(12) United States Patent
Logtenberg

(10) Patent No.: US 8,434,740 B2
(45) Date of Patent: *May 7, 2013

(54) APPARATUS (SHEAVE) FOR GUIDING CABLE IN AND OUT OF MANHOLES AND CONDUITS

(76) Inventor: Marinus R. Logtenberg, Sudbury (CA)

(*) Notice: Subject to any disclaimer, the term of this patent is extended or adjusted under 35 U.S.C. 154(b) by 140 days.

This patent is subject to a terminal disclaimer.

(21) Appl. No.: 12/821,811

(22) Filed: Aug. 30, 2010

(65) Prior Publication Data

US 2012/0049140 A1 Mar. 1, 2012

(51) Int. Cl.
| B66F 3/00 | (2006.01) |
| B63B 35/03 | (2006.01) |
| B65H 59/00 | (2006.01) |
| E21C 29/16 | (2006.01) |
| H02G 1/08 | (2006.01) |
| H01B 9/00 | (2006.01) |
| H01B 11/00 | (2006.01) |

(52) U.S. Cl.
USPC ........... 254/134.3 FT; 254/134; 254/134.3 R; 174/24

(58) Field of Classification Search ......... 254/134.3 FT, 254/134.3 R, 134; 174/24
See application file for complete search history.

(56) References Cited

U.S. PATENT DOCUMENTS

| 4,382,581 A * | 5/1983 | Wimer et al. ........ 254/134.3 FT |
| 4,609,181 A * | 9/1986 | Fisher et al. ......... 254/134.3 FT |
| 6,830,234 B2 * | 12/2004 | Tjader ............................ 254/134 |
| 7,341,403 B2 * | 3/2008 | Tsuchiya et al. ............ 405/183.5 |
| 7,514,628 B2 * | 4/2009 | Kadrnoska et al. .............. 174/24 |
| 2005/0104051 A1* | 5/2005 | Neal .............................. 254/134 |

* cited by examiner

Primary Examiner — Lee D Wilson
Assistant Examiner — Alvin Grant

(57) ABSTRACT

An apparatus consisting of sheaves/rollers is for guiding cables from a single pulling location through conduit that extends continuously between manholes and end points of conduit runs. The cable is set up at one end of the conduit run and a power driven tugger is set up at the other end of the cable pull. The apparatus is installed at each end of the run to guide the cables into the conduit through the manhole or out conduit stub. A rope is installed through the sheaves/rollers and into the conduit and then through another sheave at the other end and then connected to the cable. A power driven tugger is energized which causes tension on the rope and cable and pulls the cable through the end of the sheave.

4 Claims, 3 Drawing Sheets

APPARATUS (SHEAVE) FOR GUIDING CABLE IN AND OUT OF MANHOLES AND CONDUITS

CROSS-REFERENCE TO RELATED APPLICATION

Not Applicable

STATEMENT REGARDING FEDERALLY SPONSORED RESEARCH OR DEVELOPMENT

Not Applicable

THE NAME OF THE PARTIES TO A JOINT RESEARCH AGREEMENT

Not Applicable

BACKGROUND OF THE INVENTION

1. Field of the Invention

This invention relates to the placement of conductors/cable in conduits for the purpose of uniformly bending the conductors/cable as it enters and exits manholes and conduits.

The conductors and cables are manufactured and provided with radius curvature limits. The limit of bending radius provides the safe condition for conductors/cable to function according the specification provided by manufacturer.

In order to guarantee the proper manipulation of conductors/cable during pull-in and/or pull-out in conduits in all kinds of manholes and chambers, an apparatus was needed. The quality assurance system as well requires a safe procedure for installation of conductors/cables. The weight of conductors/cable reel and hard condition of work in manholes and chambers limits its proper manipulation by man. An apparatus was needed to ensure the safe operation of conductors/cable in all conditions.

Lack of space in manholes/chambers, limits of personal number within environment, time limit of operation to minimize public path ways blockage were the factors that necessitate a flexible, robust and safe tool.

2. Description of the Related Art Including Information Disclosed under 37 CFR 1.97 and 37 CFR 1.98

Fisher et al. (U.S. Pat. No. 4,609,181) provided a method for placement and pulling long optical cable by means of a tape as media and sub duct. The method focused on placement of maximum length of cable without applying pulling load more than manufacturer specification. The placement of conductors/cable in conduit has been considered a challenging task due to limits of manipulation criteria of cables and workspace for assuring serviceability of cables during its life cycle.

BRIEF SUMMARY OF THE INVENTION

The presented invention provides safe and secure guide for conductors/cable to be installed or pulled out via a manhole or chamber as a unique and flexible apparatus. The apparatus provides different configuration according to the alignment of conductors/cable and conduit in order to maintain radius of bending required by manufacturers. Provides secure condition of conductors/cable for manipulation, the apparatus minimize the effort and time of technicians for adjustment and installation.

The apparatus is equipped with certain sheaves in two main parts in order to guide conductors/cable with minimum friction. The arrangement of parts enables the apparatus to maintain the radius of conductors/cable above the limit of 90 degree.

BRIEF DESCRIPTION OF THE DRAWINGS

Having thus generally described the nature of the invention, references will now be made to the accompanying drawings, showing by way of illustration, preferred embodiments thereof, and in which.

DETAILED DESCRIPTION OF THE PREFERRED EMBODIMENT

Figure 1:
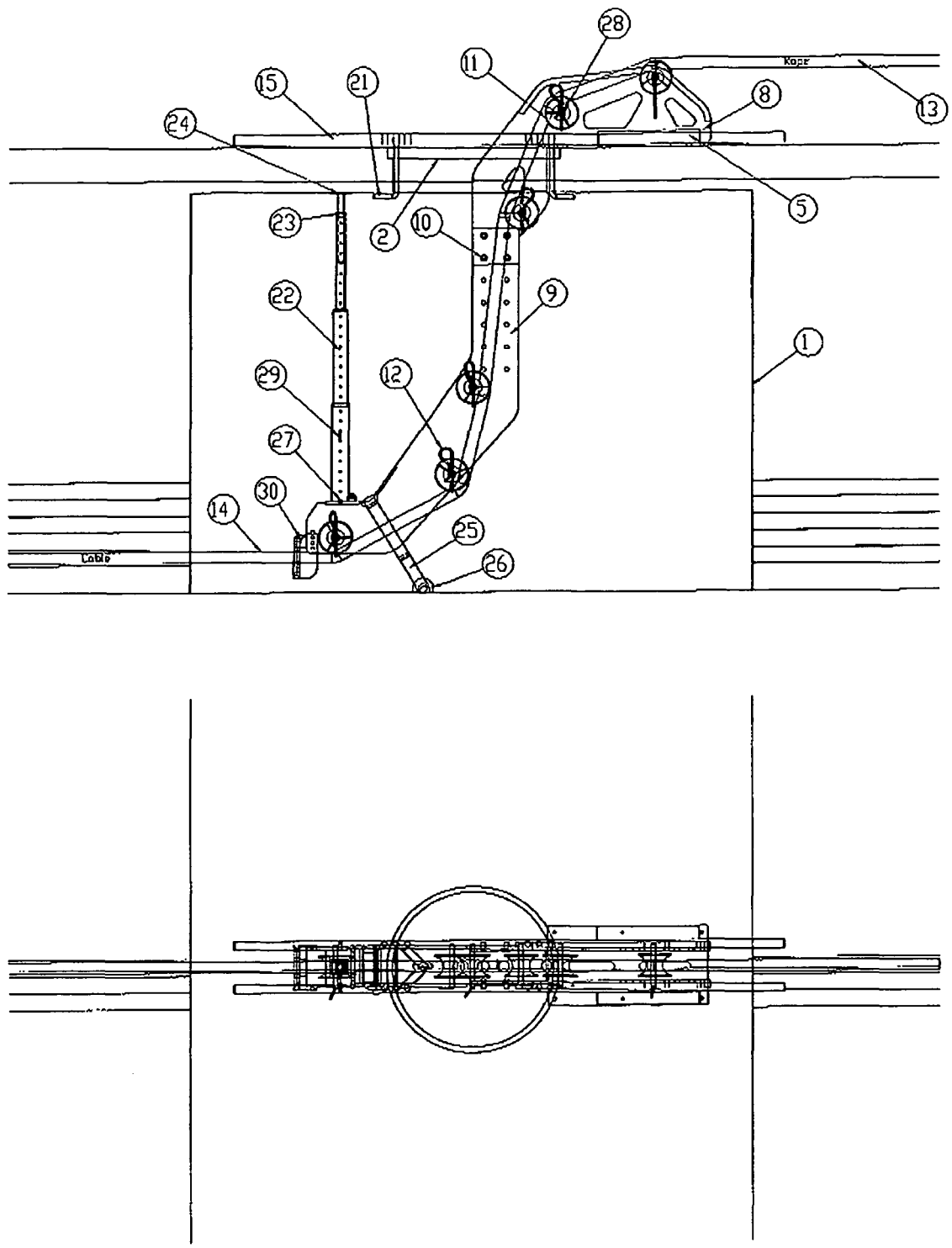
FIG. 1 illustrates the installation of the apparatus in a manhole with alignment of conductor and conduit in 180 degree in plane y axis from side and top view.

The presented invention provides safe and secure guide for conductors/cable to be installed in tunnels, conduits, manholes, chambers, ducts, trenches and similar path ways. The apparatus limits the bending curvature of the conductors/cable by means of sheaves which are arranged on a strong structure. The structure consists of two main parts which can be connected to each other by means of four bolts. The upper part (8) (FIG. 1) is installed at the opening of the manhole/chamber and bottom part (9) is installed inside of the manhole or chamber. The upper and bottom parts can be directly connected to each other by four bolts (10) in different configurations according to different layouts of manhole/chamber, conductors/cable and conduit. The upper and bottom parts can be aligned parallel in the same Cartesian plane with 180 degree, parallel in the same Cartesian plane with 360 degree and perpendicular in different Cartesian planes. In FIG. 1 top view, the upper and bottom parts are aligned in 180 degree. They can be configured by direct connection in 90, 180, 270 and 360 degrees. By connecting upper part and bottom part with a connector the alignment of the parts can be set to 45, 135, 215, and 315 degree. This capability of the apparatus provides the flexibility of installation where the cable reel and conduit are not in the same Cartesian plane.

The upper part is secured at the opening of the manhole/chamber by means of two square tubes (15) which are passed through the square tube (5), and are attached to the opening of manhole by four J-hook (21). The complete installation of the upper part provides the support for the bottom part and also prevents the apparatus from moving during conductors/cable pull-in and/or pull-out operations. In case of installation where cable reel and conductor are in different Cartesian plane, the square tubes are provided with two other tubes which are installed perpendicular to square tubes and secured by J-hooks. The assembly of four crossed tubes provides a robust and solid support for the bottom part in order to function in any alignment relative to the upper part.

For assuring that the apparatus is able to withstand the forces applied to the structure during pull of conductors/cable, an adjustable support (22) is connected to the bottom part by means of a spring loaded hook (27). The support is locked and adjusted to the underside of manhole by inserting a U-bar (29) and fastening a threaded rod (24) equipped with a wing nut (23). In order to compensate for slight offset of conduit from lowest sheave, an octagon roller unit (30) is connected to the bottom part.

In some manholes/chambers the reinforcing structure can be achieved by a sling (25) which is connected to a drilled angle iron (26).

The apparatus is designed in a manner to provide configuration required for safe guide where conductors/cable is passing through two conduits which are perpendicular to each other within a horizontal plane. This is a common case where the conductors/cable is required to pass through one conduit between two manholes and then to turn 90 degree at the destination manhole to enter a second conduit which ends at the third manhole. The configuration of three manholes forms a 90 degree angle with end points at manholes. For this purpose, the upper and bottom parts are disassembled. The upper part is installed at the opening of the intersection manhole of conduits and the bottom part is rotated 90 degree (rotation around x axis illustrated in FIG. 3) to align within the horizontal plane of two conduits. An intermediate connection is connected to the upper part by four bolts and the other end which is flange type is connected to the bottom part with four bolts accordingly. The intermediate connection can be used with an inclined flange where the conduits are not at the same height. In this configuration the upper part provides robust support for the bottom part which guides conductors/cable in a 90 degree turn of intersecting conduits.

Figure 2:
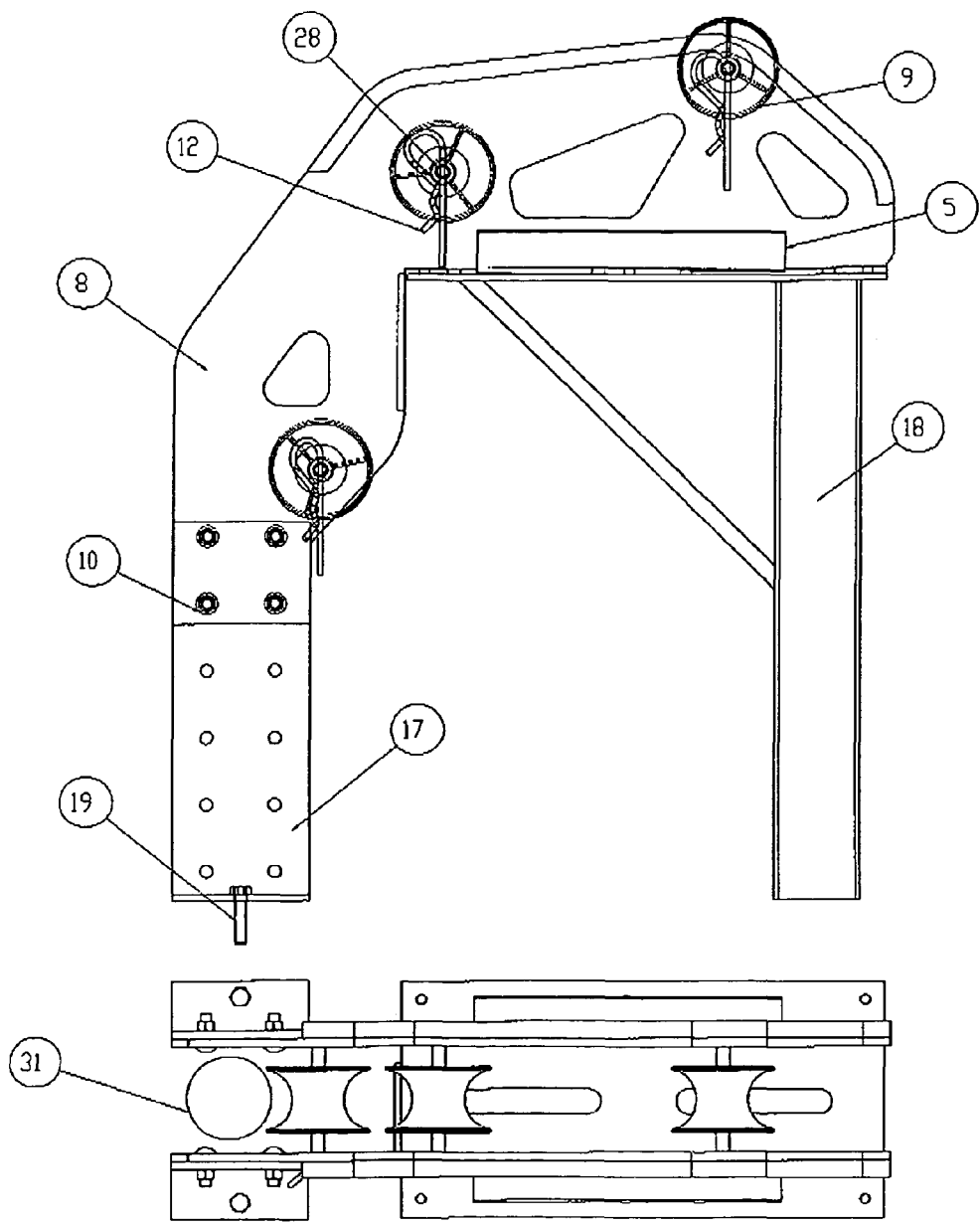
FIG. 2 illustrates the upper part of the apparatus which is installed on manhole opening for vertical pull of conductors/cable form a vertical conduit from side and top view.

In case of conductors/cable pull through a vertical shaft or conduit, the apparatus is disassembled, the upper part is equipped with leg (18) and support (17) illustrated in FIG. 2. The support is secured to the floor by means of two drop-in anchors and bolts (19).

Figure 3:
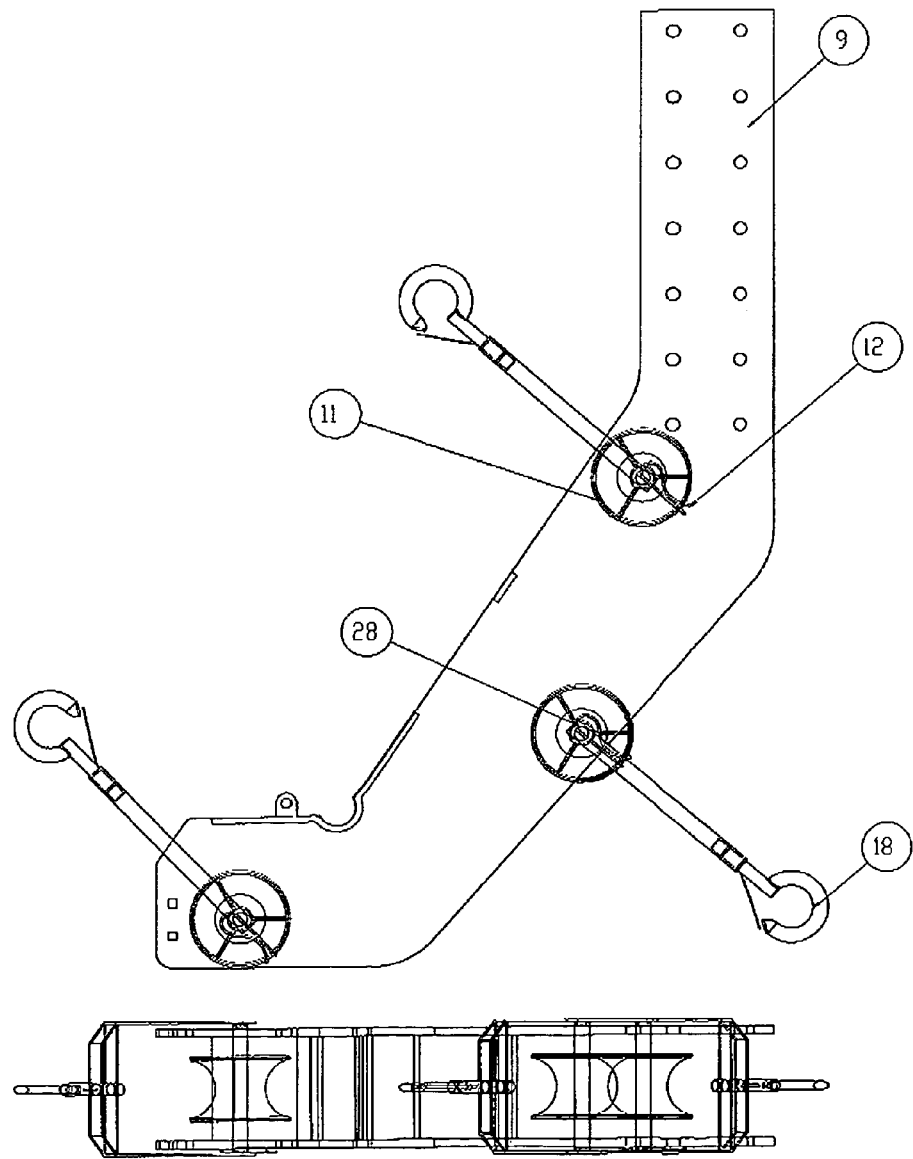
FIG. 3 illustrates the bottom part of the apparatus which is installed at the bottom of a manhole for pull-in and pull-out of conductors/cable into a vertical conduit from side and top view.

In order to adjust and maintain the alignment of the bottom part, it is secured to the bottom of shaft, manhole, pathway or chamber by means of three yoke hooks (18) illustrated in FIG. 3. The hooks are connected to the structure at sheaves by replacing the pins and substituting them with longer pins. Chains and slings are used to fasten the yoke hooks to appropriate supports.

I claim:

1. An apparatus comprising two units usable together or separately for guiding conductor/cable during pull in and out from a conduit, manhole or chamber within, the range for pulling force and radius of curvature, recommended by manufacturer, the apparatus comprising:
    (i) an upper unit comprising three sheaves/rollers installed between two plates creating a 90 degree angle with multiple holes;
    (ii) a bottom unit comprising three sheaves/rollers installed between two plates creating a 90 degree angle with multiple holes;
    (iii) an upper adjustable leg mounted on the lower section of said bottom unit; wherein said multiple holes of said upper unit facilitate the bolting of said bottom unit to said upper unit and the installation within the opening of the manhole or chamber and secured outside of the manhole or chamber opening using two square horizontal supports tubes through square holes on a base plate of said upper unit which spans across the opening and secured to the underside of the manhole opening using J hooks or bolts for anchoring into the collar of the chamber or manhole which eliminates the possibility of the entire unit falling into the manhole or chamber and reinforcing and stabilizing said unit for guiding the conductor/cable in and out of a manhole or chamber and; and wherein said multiple holes in said bottom unit are configured to facilitate the horizontal adjustability through angles ranging from 90 to 180 degrees and a vertical alignment by bolting to said upper unit inside a manhole or chamber and secured by means of slings tied to a tie point on side plates of said bottom unit and anchored to a side wall and/or floor; and wherein said adjustable leg is extended up to the underside of said manhole or support tubes which provide reinforcement and stability for said bottom unit and providing guidance for conductor/cable in/out said conduit and provide a secure installation of the apparatus within the applied force during pull in/out operations.

2. The apparatus of claim 1, wherein said upper unit is installed independently over a vertical configuration of a conduit stub using two legs bolted through the multiple holes for securing the bottom unit and an installed base stand and bolted to the floor which provides a 90 degree offset which allows the positioning of a power driven tugger being placed at a distance sufficient for pulling conductor/cable out of a conduit or installed at a manhole and/or chamber opening for guiding in/out of conductor/cable.

3. The apparatus of claim 1, wherein said bottom unit is installed independently at any angle by installing yoke hooks, replacing rods holding the sheave/rollers with longer rods wherein said yoke hooks are installed over each roller and by using multiple tie points for redirecting conductor/cable during a pull.

4. The apparatus of claim 1, wherein said sheaves/roller of the apparatus can be changed to match the diameter and bending radius of conductor/cable during installation.

* * * * *